United States Patent
Chan et al.

(10) Patent No.: US 7,379,952 B2
(45) Date of Patent: May 27, 2008

(54) TECHNIQUES FOR MULTIPLE WINDOW RESOURCE REMASTERING AMONG NODES OF A CLUSTER

(75) Inventors: Wilson Wai Shun Chan, San Mateo, CA (US); Sashikanth Chandrasekaran, Chennai (IN); Tolga Yurek, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 458 days.

(21) Appl. No.: 10/832,527

(22) Filed: Apr. 26, 2004

(65) Prior Publication Data

US 2005/0171927 A1    Aug. 4, 2005

Related U.S. Application Data

(60) Provisional application No. 60/540,858, filed on Jan. 30, 2004.

(51) Int. Cl.
*G06F 12/00* (2006.01)
*G06F 17/30* (2006.01)
(52) U.S. Cl. ...................... 707/204; 707/203
(58) Field of Classification Search ............. 707/204
See application file for complete search history.

(56) References Cited

U.S. PATENT DOCUMENTS

| | | | |
|---|---|---|---|
| 4,972,316 A * | 11/1990 | Dixon et al. ................. | 711/113 |
| 5,060,144 A | 10/1991 | Sipple et al. | |
| 5,161,227 A | 11/1992 | Dias et al. | |
| 5,202,971 A | 4/1993 | Henson et al. | |
| 5,287,521 A | 2/1994 | Nitta et al. | |
| 5,301,337 A * | 4/1994 | Wells et al. ................. | 718/104 |
| 5,403,639 A | 4/1995 | Belsan et al. | |
| 5,408,653 A | 4/1995 | Josten et al. | |
| 5,440,732 A | 8/1995 | Lomet et al. | |
| 5,452,447 A | 9/1995 | Nelson et al. | |
| 5,551,046 A | 8/1996 | Mohan et al. | |

(Continued)

OTHER PUBLICATIONS

Oracle Corporation, "Cache Fusion and the Global Cache Service," Oracle9i Applicaton Clusters Concepts, Release 2 (9.2), Part No. A96597-01, 1998, 2002, http://download-west.oracle.com/docs/cd/B10501_01/rac.920/a96597/pslkgdtl.htm#20495, data retrieved Aug. 6, 2004, pp. 1-6.

(Continued)

*Primary Examiner*—John Cottingham
*Assistant Examiner*—Mariela D Reyes
(74) *Attorney, Agent, or Firm*—Hickman Palermo Truong & Becker LLP

(57) ABSTRACT

Remastering of shared resources among nodes in a cluster, while minimizing the time that such resources are unavailable for access, comprises dividing the shared resources being remastered into multiple "windows" and freezing and remastering one window at a time. The remastering windows are defined over one or more buckets associated with a hash table of resources. In clusters with unequally sized hash tables, an enhancement to the fundamental windowing approach utilizes a functionally specific hashing algorithm and a hash table size constraint to ensure that the set of all resources that hash to a given bucket in a hash table of a given size will hash precisely to the same bucket, plus a set of higher buckets which are well defined, in a node that has a larger hash table.

31 Claims, 4 Drawing Sheets

TABLE T1

| | | |
|---|---|---|
| * | b1 | RES1, RES4, RES7, RES10 |
| | b2 | RES2, RES5, RES8 |
| * | b3 | RES3, RES6, RES9 |

REMASTER WINDOW(b1, b3) FROM TABLE T1

TABLE T2

| | | |
|---|---|---|
| * | b1 | RES1, RES7 |
| | b2 | RES2, RES8 |
| * | b3 | RES3, RES9 |
| * | b4 | RES4, RES10 |
| | b5 | RES5 |
| * | b6 | RES6 |

TABLE T3

| | | |
|---|---|---|
| * | b1 | RES1, RES10 |
| | b2 | RES2 |
| * | b3 | RES3 |
| * | b4 | RES4 |
| | b5 | RES5 |
| * | b6 | RES6 |
| * | b7 | RES7 |
| | b8 | RES8 |
| * | b9 | RES9 |

U.S. PATENT DOCUMENTS

| | | | |
|---|---|---|---|
| 5,581,737 A * | 12/1996 | Dahlen et al. | 711/170 |
| 5,612,865 A | 3/1997 | Dasgupta | |
| 5,892,945 A | 4/1999 | Mirchandaney et al. | |
| 5,893,086 A | 4/1999 | Schmuck et al. | |
| 5,963,960 A | 10/1999 | Swart et al. | |
| 5,963,963 A | 10/1999 | Schmuck et al. | |
| 5,970,495 A | 10/1999 | Baru et al. | |
| 5,999,712 A | 12/1999 | Moiin et al. | |
| 6,023,706 A | 2/2000 | Schmuck et al. | |
| 6,026,293 A | 2/2000 | Osborn | |
| 6,026,394 A | 2/2000 | Tsuchida et al. | |
| 6,041,384 A | 3/2000 | Waddington et al. | |
| 6,047,283 A | 4/2000 | Braun | |
| 6,052,697 A | 4/2000 | Bennett et al. | |
| 6,058,389 A | 5/2000 | Chandra et al. | |
| 6,081,900 A | 6/2000 | Subramaniam et al. | |
| 6,101,495 A | 8/2000 | Tsuchida et al. | |
| 6,108,654 A | 8/2000 | Chan et al. | |
| 6,144,983 A | 11/2000 | Klots et al. | |
| 6,173,313 B1 | 1/2001 | Klots et al. | |
| 6,185,601 B1 | 2/2001 | Wolff | |
| 6,209,074 B1 | 3/2001 | Dell et al. | |
| 6,249,879 B1 | 6/2001 | Walker et al. | |
| 6,253,273 B1 | 6/2001 | Blumenau | |
| 6,272,491 B1 | 8/2001 | Chan et al. | |
| 6,292,795 B1 | 9/2001 | Peters et al. | |
| 6,314,114 B1 | 11/2001 | Coyle et al. | |
| 6,341,340 B1 | 1/2002 | Tsukerman et al. | |
| 6,363,396 B1 * | 3/2002 | Klots et al. | 707/103 Y |
| 6,401,110 B1 | 6/2002 | Freitas et al. | |
| 6,449,699 B2 | 9/2002 | Franke et al. | |
| 6,449,734 B1 | 9/2002 | Shrivastava et al. | |
| 6,453,404 B1 | 9/2002 | Bereznyi et al. | |
| 6,529,906 B1 | 3/2003 | Chan | |
| 6,618,744 B1 | 9/2003 | Simmons et al. | |
| 6,668,270 B1 | 12/2003 | Simmons et al. | |
| 6,708,198 B1 | 3/2004 | Simmons et al. | |
| 6,715,146 B1 | 3/2004 | Simmons et al. | |
| 6,751,616 B1 | 6/2004 | Chan | |
| 6,920,454 B1 * | 7/2005 | Chan | 707/8 |
| 7,085,911 B2 * | 8/2006 | Sachedina et al. | 711/206 |
| 2003/0200398 A1 | 10/2003 | Harris | |
| 2004/0220933 A1 | 11/2004 | Walker | |
| 2005/0149540 A1 | 7/2005 | Chan et al. | |

OTHER PUBLICATIONS

Oracle Corporation, "High Availablility Concepts and Best Practices in Real Application Clusters," Oracle9i Real Application Clusters Concepts, Release 2 (9.2), Part No. A96597-01, 1998, 2002, http://download-west.oracle.com/docs/cd/B10501_01/rac.920/a96597/pshavdtl.htm#15424, data retrieved Aug. 6, 2004, pp. 1-20.

European Patent Office, "Communication pursuant to Article 96(2) EPC," dated Feb. 11, 2005, 6 pages.

Current Claims, EP 99 968 071.3, 8 pages.

European Patent Office, "Communication pursuant to Article 96(2) EPC," EP 99 968 071.3, dated Feb. 11, 2005, 6 pages.

Current Claims, EP 99 968 071.3, 8 pages.

Mirchandaney, R., "Improving the Performance of DSM Systems via Compiler Involvement", Supercomputing '94, Proceedings, pp. 763-772.

Hauptmann S., Wasel J.: "*On-Line Maintenance with On-the-Fly Software Replacement,*" Proceedings of the Third International Conference on Configurable Distributed Systems, Annapolis, MD. May 6-8, 1996, IEEE Computer Society Press, Los Alamitos, CA, P. 70-80, XP002134719.

Loomis, Mary E.S., ODBMS, "Object Locking", Mar./Apr. 1992, pp. 53-56.

Apple Computer, Inc., Apple Press, "OpenDoc Cookbook for the Mac OS", 1996, pp. 187-189.

Aldred, M., et al., "A Distributed Lock Manager on Fault Tolerant MPP", Encore Comput. Corp., Marlborough, MA, 1995, pp. 134-136.

CORBAservices, "CORBAservices: Common Object Services Specification", Mar. 1995, pp. 7-1 to 7-14.

European Patent Office, "European Search Report", application no. 07106281.4-2211, dated Jul. 27, 2007, 8 pages.

Claims, application no. 07106281.4-2211, 2 pages.

Khalidi, Yousef A., et al., "Solaris MC: A Multi-Computer OS", Sun Microsystems, XP-002437395, Proceedings of the USENIX 1996 annual technical conference, published Jan. 1996, 18 pages.

Matena, Vlada, et al., "Solaris MC File System Framework", Sun Microsystems, XP-002437394, retrieved from website <http://research.sun.com/techrep/1996/smli_tr-96-57.pdf>, dated Oct. 1996, 20 pages.

\* cited by examiner

TECHNIQUES FOR MULTIPLE WINDOW RESOURCE REMASTERING AMONG NODES OF A CLUSTER

CROSS REFERENCE TO RELATED APPLICATIONS

This application claims priority to U.S. Provisional Patent Application No. 60/540,858 filed on Jan. 30, 2004, entitled "Techniques To Allow Multiple Window Resource Remastering When Cache Sizes Are Not The Same In Different Nodes Of A Clustered Environment"; which is incorporated by reference in its entirety for all purposes as if fully set forth herein.

FIELD OF THE INVENTION

The present invention relates generally to clustered computing systems and, more specifically, to techniques for allowing multiple-window resource remastering among nodes of a cluster.

BACKGROUND OF THE INVENTION

A "cluster" is the result of "clustering" computing resources together in such a way that they behave like a single resource. Clustering is often used for purposes of parallel processing, load balancing and fault tolerance. One common example of a cluster is a set of computers, or "nodes", that are configured so that they behave like a single computer. Each computer in the cluster has shared access to a set of resources. A resource is, generally, any item that can be shared by the computers in the cluster. A common example of a resource is a block of memory in which information is stored. The block of memory may be part of a node in the cluster or may be external to the cluster, such as a database block.

A cluster comprises multiple nodes that each executes an instance of a server that facilitates access to a shared set of resources on behalf of clients of the cluster. One example of a cluster is a database cluster. A database cluster comprises multiple nodes that each executes an instance of a database server that facilitates access to a shared database. Among other functions of database management, a database server governs and facilitates access to the particular database by processing requests by clients to access data in the database.

Typically, resources are assigned to masters, where each master coordinates the sharing of the resources assigned to it. A single node is the master of a given shared resource. A master has a global view of the state of the shared resources that it masters at any given time and acts as a coordinator for access to the shared resource. For example, a master coordinates and is aware of which node is currently granted a lock or latch on the shared resource (and what type of lock or latch) and which nodes are queued to obtain a lock or latch on the shared resource. Typically, the master's global view of the status of a shared resource is embodied in metadata associated with the resource.

Each shared resource is mapped to a master. Various mechanisms may be used to establish the resource-to-master mapping. Techniques for using hash tables to establish the resource-to-master mapping are described in detail, for example, in U.S. Pat. No. 6,363,396. The techniques described herein are not limited to any particular mechanism for establishing the resource-to-master mapping.

For efficient management of resources, it is important for each master to quickly locate the information maintained by the master for any of the resources that it masters. To improve access to the resource information, the resources mastered by a given node are often hashed to a table, i.e., a hash table, via a hashing algorithm ("hash function"). Specifically, to locate information maintained for a particular resource, a hash function may be applied to an identifier associated with the resource to produce a hash value. Using the hash value as an index into the hash table, the master locates a hash table entry associated with the resource. From the hash table entry, the master obtains information about the location of the information maintained for the resource.

The hash function effectively sections the hash table into "buckets" to which each resource is mapped. To avoid excessive latch contention while maintaining acceptable and reasonable performance from the cluster, it is desirable to limit the number of resources mapped to a given bucket. Thus, the number of buckets in the resulting hash table is based on (1) a desired per-bucket maximum number of resources, and (2) the number of resources mastered by the node. Thus, to avoid exceeding the desired per-bucket maximum, a node that masters more resources will generally use a hash function that hashes resources to more buckets than the hash function used by a node that masters fewer resources.

FIG. 1 is a diagram that illustrates a set of resources $102a$-$102n$ that are mapped into particular buckets, b1-b3, of a hash table 106 through a hash function 104. The hash table 106 is used to access information about the resources being mastered by a master node. In this general example, the hash function takes as input some identifier of the resource being hashed, shown as resource identifier "resid", and depending on the value that is output, the resource is mapped to a particular bucket of the hash table. Resources that map to the same bucket are associated with each other due to their mapping to the given bucket. Typically, providing a latch to a given resource provides the latch to the entire bucket of resources that hash to the same bucket as the given resource.

In a cluster with asymmetric nodes, where the nodes have asymmetric processing and/or memory capabilities, the number of resources that a given node can master often depends on the node's cache size, which typically depends on the node's overall memory size. Because the number of resources hashed to each bucket is relatively fixed, optimally, a node with more memory will master more resources and, consequently, have a larger hash table (a hash table having more buckets) to access the information maintained by the master for those resources.

Mastership of shared resources in a cluster benefits from dynamic adjustments based on emerging affinity patterns (where a particular node is continuously and/or repeatedly accessing a particular resource set) or for pure load balancing reasons, for example. Dynamic remastering of the shared resources requires a certain freeze stage for redistribution of these resources, whereby information about the resources being remastered is transferred from one node to another, during which lock operations on the remastered resources are not allowed. There is room for improvement in minimizing the freeze time associated with dynamic remastering of resources shared among nodes in a cluster.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION OF EMBODIMENTS OF THE INVENTION

Figure 1:
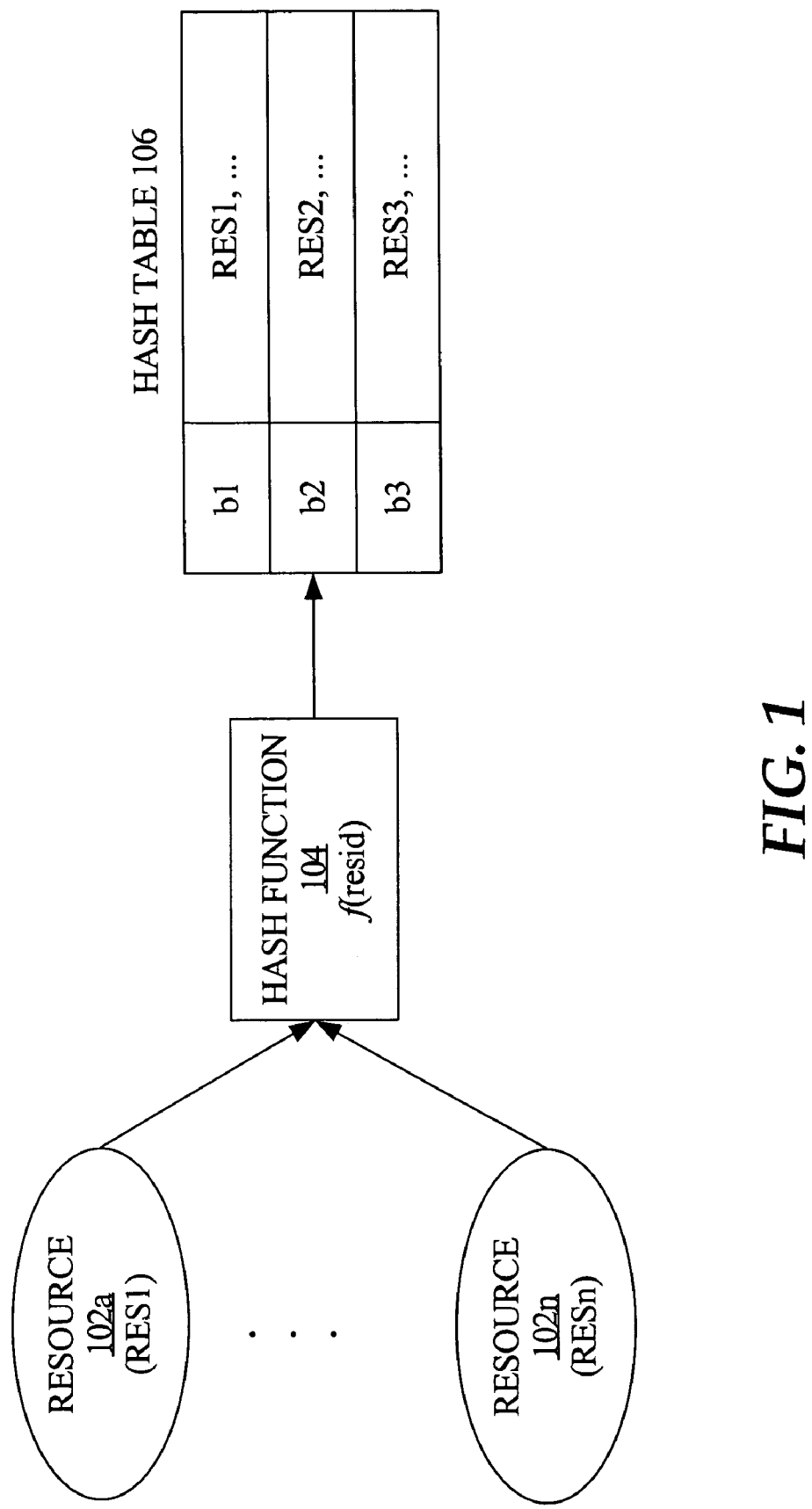
FIG. 1 is a diagram that illustrates a set of resources mapped into a hash table through a hash function.

In the following description, for the purposes of explanation, numerous specific details are set forth in order to provide a thorough understanding of embodiments of the present invention. It will be apparent, however, that embodiments of the present invention may be practiced without these specific details. In other instances, well-known structures and devices are shown in block diagram form in order to avoid unnecessarily obscuring embodiments of the present invention.

Functional Overview of Embodiments

Techniques are described for remastering shared resources among nodes in a cluster, while minimizing the time that such resources are unavailable for access ("freeze time"). These techniques include techniques for dynamically remastering resources among nodes having different processing and/or memory capabilities.

In one aspect, the duration of the freeze time is minimized by dividing the shared resources being remastered into multiple "windows" and freezing and remastering one window at a time. The remastering windows are defined over one or more buckets associated with a hash table of resources. The multiple window strategy works well when the hash tables in the nodes are identically sized and a given resource hashes to the same bucket in all the nodes.

In clusters with asymmetric nodes having unequal capabilities and, consequently, unequally sized hash tables, an enhancement to the fundamental windowing approach is described. In general, a functionally specific hashing algorithm and a hash table size constraint ensure that the set of all resources that hash to a given bucket in a hash table of a given size will hash precisely to the same bucket, plus a set of higher buckets which are well defined, in a node that has a larger hash table. Conversely, the set of all resources that hash to the set of well-defined buckets in the node with the larger hash table will hash to the single given bucket in the node with the smaller hash table.

The hash table size requirement that is imposed is that the size of each hash table for all nodes in the cluster must be a multiple of the smallest hash table in the cluster. Furthermore, the hashing algorithm is such that any key generated by the algorithm is hashed to a hash table via a modulus operation using the size of the hash table to which it is being hashed. Therefore, it is possible to define a window in the smallest hash table in the cluster and precisely extend that window to a larger set of buckets in larger hash tables, while ensuring that every such window for each node will contain a set of resources that hash to the matching window on all other nodes.

Operating Environment

An embodiment of the invention may be implemented in an operating environment referred to as a cluster. As previously described, a database cluster comprises multiple nodes that each executes an instance of a database server ("server") that each facilitates access to a shared database. Each node comprises a combination of computing hardware, such as computing system 400 of FIG. 4, and a server instance. Each server instance comprises a combination of integrated software components and an allocation of computational resources (such as memory and processes) for executing the integrated software components on one or more processors of a node, where the combination of the software and computational resources are used to manage a particular common database on behalf of clients of the cluster.

The operating environment includes clients that are communicatively coupled to the cluster of database servers. The database servers are communicatively coupled to the shared database. The clients are applications or programs that cause execution of processes on the database cluster via a network, for example. A client may execute, for non-limiting examples, on a desktop computer or on an application server.

In the context of a database cluster, the database is a repository for storing data and metadata on a persistent memory mechanism, such as a set of hard disks. Such data and metadata may be stored in the database logically, for example, according to relational database constructs, multidimensional database constructs, or a combination of relational and multidimensional database constructs. When a server accesses data from the shared database, it typically copies the data into the volatile memory of the node on which the server is executing. For example, the data is copied into the node's cache memory for manipulation purposes. Another server on another node may subsequently access the data, either from the other node's cache memory or from persistent storage, depending on the database architecture.

Hash Table Size Constraint

According to one aspect of the invention, the size of each hash table for each node in a cluster is constrained to a whole number multiple of the size of the smallest hash table for a node in the cluster. The possible whole number multiples include a multiplier of 1, so that there can be more than one hash table having the smallest size. Hence, if the smallest hash table has 3 buckets, all of the other hash tables for nodes in the same cluster must be sectioned into 3 buckets, 6 buckets, 9 buckets, 12 buckets, 15 buckets, and so on.

In one embodiment, satisfaction of the whole number multiple constraint is ensured by constraining the hash tables for all nodes in a given cluster to a size that is a power of 2, such as $2^2$, $2^3$, $2^4$, $2^5$, etc. Therefore, every hash table must be sized with either 2 buckets, 4 buckets, 8 buckets, 16 buckets, and so on.

Hash Function

As mentioned, to which bucket a particular resource maps is based on the hash function. According to one aspect of the invention, resources are mapped to a hash table using a hash function based on the resource id and the respective hash table size, e.g., f(resid, n) where resid is the resource id and n is the number of buckets in the respective hash table. Specifically, the hash function utilizes a modulus operation using the size of the hash table to which resources are being hashed.

In this context, the modulus defines the "base" with respect to which a hash value is computed. In other words, the modulus defines a set of values, one (the next smallest from the set) of which is subtracted from values that exceed the one value to arrive at a final value. In this aspect, the size of the hash table that is being populated dictates the set of values. For example, with a hash table having 4 buckets, the set of values are multiples of 4, (4, 8, 12, 16, . . . ). Thus, when an interim calculation of the hash function generates (a) a value of 5, then 4 is subtracted, leaving a value of 1, so this resource is mapped to bucket 1; (b) a value of 6, then 4 is subtracted, leaving a value of 2, so this resource is mapped to bucket 2; (c) a value of 8, then 4 is subtracted, leaving a value of 4, so this resource is mapped to bucket 4; (d) a value of 9, then 8 is subtracted, leaving a value of 1, so this resource is mapped to bucket 1; (e) a value of 14, then 12 is subtracted, leaving a value of 2, so this resource is mapped to bucket 2; and so on.

Remastering Resources in Windows of Buckets

According to one aspect of the invention, resources are remastered from one node to one or more other nodes, one window of buckets at a time. As used herein, "window" refers to a subset of the buckets that contain resources that are being remastered. However, not all of the resources contained in a bucket within the window of buckets are necessarily being remastered. Thus, a given bucket that is within the window in which some resources are being remastered may contain one or more resources that are being remastered and one or more resources that are not being remastered. For example, a node may access master resource information using a six-bucket hash function. The remastering operation may be broken up into two windows, where each window corresponds to a subset of the six hash buckets (e.g., subsets of 3 buckets each; subsets of 2 buckets and 4 buckets; subsets of 1 bucket and 5 buckets).

Hence, with a goal of minimizing resource freeze time, only resources that are contained in buckets in a given remastering window, and that are actually being remastered, are frozen during the remastering process for that particular remastering window. All other resources outside of the particular remastering window, and the resources that are not being remastered that are contained in the buckets in the remastering window, are still available to the cluster while the particular resources that are being remastered are frozen.

Figure 2:
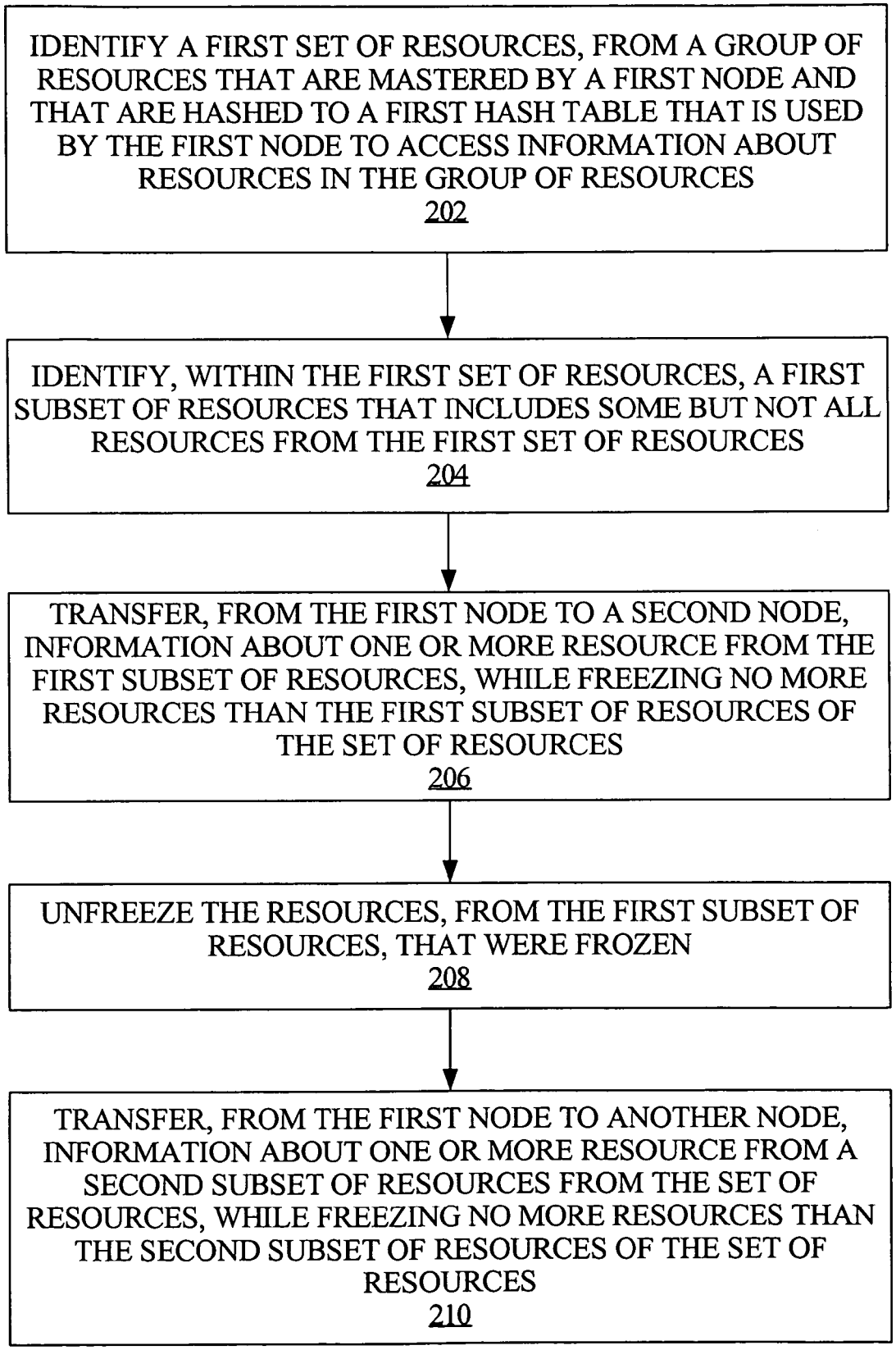
FIG. 2 is a flow diagram that illustrates a process for remastering resources in a cluster, according to an embodiment of the invention.

FIG. 2 is a flow diagram that illustrates a process for performing a remastering operation on resources in a cluster, according to an embodiment of the invention.

At block 202, a first set of resources is identified, from a group of resources that are mastered by a first node and that are hashed to a first hash table that is used by the first node to access information about the group of resources. The resources in the first set of resources are to be migrated to a second node during the remastering operation, and hashed to a second hash table that is used by the second node to access information about resources that are mastered by the second node. As mentioned, hash tables are used by nodes in a cluster to access information about resources, such as information that represents the status of database blocks or name-value pairs in a data tree, that are shared among the nodes in the cluster.

At block 204, a first subset of resources, within the first set of resources, is identified. The first subset includes some, but not all, of the resources of the first set.

At block 206, information about one or more resource from the first subset of resources is transferred from the first node to the second node. For example, metadata regarding the status of latches on certain resources may be transferred from a current master node to a new master node. Significantly, no more than the resources from the first subset of resources are frozen during the transfer of information. In one embodiment, only the resources from the first set of resources that are being remastered are frozen. Hence, resources within the first set of resources that are not actually being remastered are not frozen and are accessible to the cluster.

At block 208, the resources that were frozen, from the first subset of resources, are unfrozen and, at block 210, information about one or more resource, from a second subset of resources from the first set resources, is transferred from the first node to another node. As before, no more than the resources from the second subset of resources are frozen during the transfer of information. In the scenario exemplified in FIG. 2, the resources in the first subset of resources are different than the resources in the second subset of resources. Hence, all of the resources that are shared among nodes in the cluster are not all frozen at once and, consequently, the free ("unfrozen") resources may still be available for reading and writing by nodes in the cluster so that operation of the cluster is still available to some extent.

Another way to generally describe the process depicted in FIG. 2 is that resources that are to be remastered (e.g., the first set of resources) are identified. Then, one or more windows (e.g., the first subset of resources being one window and the second subset of resources being another window), each encompassing one or more buckets, are identified, where each bucket has a set of one or more resources associated therewith. The buckets that contain the resources being remastered are determined by hashing a resource identifier via the hash function. A window can be described as a unit of table freeze. Freezing of some of the resources associated with the buckets is performed incrementally, i.e., window by window, while information about some of the frozen resources are transferred from one node to another. Thus, resources for which information is being transferred are frozen momentarily, i.e., operations on the resources are blocked, so that other nodes do not change the state of the resources while the state information is being transferred, while minimizing the number of resources that are frozen at any given time.

Any number of actions may trigger the process of dynamically changing mastership of particular resources from a first node to one or more other nodes in a cluster. In one implementation, communication among the nodes in the cluster occurs in order to propose and agree upon the configuration of the windows, e.g., how many windows should there be and which buckets should be assigned to which windows. The configuration of the window may be based, for example, on a heuristic algorithm that takes into account the cache memory sizes for the respective nodes and the trade-off between the magnitude of resources frozen at any given time and the overhead associated with maintaining and managing the windowing approach. Which node that is involved in the process initiates the need to identify the window configuration and which node proposes a window configuration may vary from implementation to implementation.

In a scenario in which the first and second hash tables, or even all of the hash tables for all of the nodes, have an equal number of buckets, then the window for each respective node contains the same number of buckets and maps to the same buckets in each node (i.e., according to a one-to-one relationship). However, in scenarios in which the number of buckets for various nodes is different, such as with hash tables for nodes having unequal memory capabilities, a given resource will likely hash to different buckets in different tables for unequal nodes (i.e., according to a one-to-many or many-to-one relationship, but never a many-to-many relationship). Hence, in cluster configurations in which nodes have different memory capabilities and, therefore, are likely to master different numbers of resources and, therefore, have different sizes of hash tables, the hash function and the hash table size constraints described herein are beneficial. Consequently, it is possible to define a window in the smallest hash table in the cluster and precisely extend that window to a larger set of buckets in larger hash tables, while ensuring that every such window for each node will contain a set of resources that hash to the matching window on all other nodes.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. Therefore, the specification and drawings are, accordingly, to be regarded in an illustrative rather than a restrictive sense.

For example, the techniques are described in the context of remastering resources from one node to only one other node (e.g., transferring from one hash table to only one other hash table), however, the more general application includes remastering resources from multiple source nodes to multiple target nodes. Furthermore, (1) the hash tables associated with the source nodes may each be different sizes; (2) the hash tables associated with the target nodes may each be different sizes; and (3) the hash tables associated with both the source nodes and the target nodes may each be different sizes. Still further, some target hash tables may also be source hash tables.

For another example, the techniques are described in which the resource mastership is reconstructed in the target location based on the contents of master data structures in the source location, however, the resource mastership may be reconstructed in the target location based on the contents of clients of the master data structures. Thus, if a node has a shared (S) lock on a resource, this fact is represented in the node that owns the S lock (called the "client") as well as the node that is the master for that resource. If the mastership is constructed in the target location based on the contents of the client data structures and the client data structures also use the same hashing function, then the same windowing technique can be used to determine which client data structures' information needs to be sent to the target location at the new master.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

EXAMPLES

Assume there are two different nodes with two different hash table sizes: Node 1 has a hash table of size n1 and node 2 has a larger hash table of size n2, both powers of 2. Thus, n2/n1=k is also a power of 2. A given bucket b in the smaller hash table, where 1<=b<=n1, maps to the set of buckets in the larger hash table defined by (b, n1+b, 2*n1+b, 3*n1+b, . . . , (k−1)*n1+b), which can be denoted by summation of m*n1+b where m goes from 0 to k−1. Hence, a given window of buckets in node 1 maps to an extended set of buckets in node 2, and a mutually exclusive set of windows covering the whole hash table in node 1 will also have a matching set of mutually exclusive, extended windows in node 2 which also cover the entire hash table of node 2.

Figure 3:
FIG. 3 illustrates an example of remastering of resources, according to an embodiment of the invention.

FIG. 3 illustrates an example of remastering of resources, according to an embodiment of the invention. Resources mastered by a node, node 1, are organized in a hash table, Table T1, which is the smallest hash table of nodes in a cluster containing nodes 1-3. If a remaster window contains the resources associated with buckets b1 and b3 (denoted with asterisks) of Table T1, and the relevant resources are being remastered to node 2, which is associated with Table T2 having six buckets (a multiple of three, the size of the smallest table), then the resources associated with b1 and b3 of Table T1 (depicted as RES1, RES4, RES7, RES10 for b1; RES3, RES6, RES9 for b3) will map to buckets (denoted with asterisks) b1 (RES1, RES7), b3 (RES3, RES9), b4 (RES4, RES10), and b6 (RES6) of Table T2.

Likewise, if such resources are remastered from node 1 to node 3, which is associated with Table T3 having nine buckets (a multiple of three, the size of the smallest table), then the resources associated with b1 and b3 of Table T1 will map to buckets (denoted with asterisks) b1 (RES1, RES10), b3 (RES3), b4 (RES4), b6 (RES6), b7 (RES7) and b9 (RES9) of Table T3.

FIG. 3 illustrates that use of the techniques will guarantee that the set of all resources that can be hashed to a given bucket in a hash table of a given size will hash precisely to the same bucket, plus a set of higher buckets, which are well defined in a node that has a larger hash table size. This makes it possible to define a window in the smallest hash table in the cluster and precisely extend that window to include a set of higher buckets in larger hash tables, while ensuring that every such window on each node contains a set of resources that hash to the matching window on all other nodes. Hence, during a dynamic resource remastering process, freezing of resources can be limited to blocking operations on only the resources being remastered that are associated with the window of buckets. Furthermore, the remastering process will not fail due to a target node communicating information about a particular resource to a source node, because the particular resource is contained in the window associated with the target node, when the source node is not prepared to receive such information because the particular resource is not contained in the window associated with the source node.

Another example follows, which is not in reference to FIG. 3, in which resources are to be remastered from three different nodes to one other node. Resources RES1, RES4, RES7, RES5, RES3 and RES6 need to be remastered to a new table, target Table T4, from where they are currently mastered, as follows: @T1->RES1 (in b1), RES5 (in b2); @T2->RES4 (in b4), RES3 (in b3); @T3->RES7 (in b7), RES6 (in b6). Table T1 is the smallest table so the windows are determined based on T1, for example. Assume the window size is one, so one bucket from T1 will be frozen at a time. Using the first window, @T1, resources that need to be remastered from bucket b1 are frozen (RES1); @T2, resources that need to be remastered from corresponding buckets b1 and b4 are frozen (RES4); and @T3, resources that need to be remastered form corresponding buckets b1, b4 and b7 are frozen (RES7). RES1, RES4 and RES7 are then reconstructed in T4, where the target bucket(s) in T4 is (are) from the set [b1, b4, b7, b10, b13, . . . ]. The same logic applies to the next window until all windows are completed.

Hardware Overview

Figure 4:
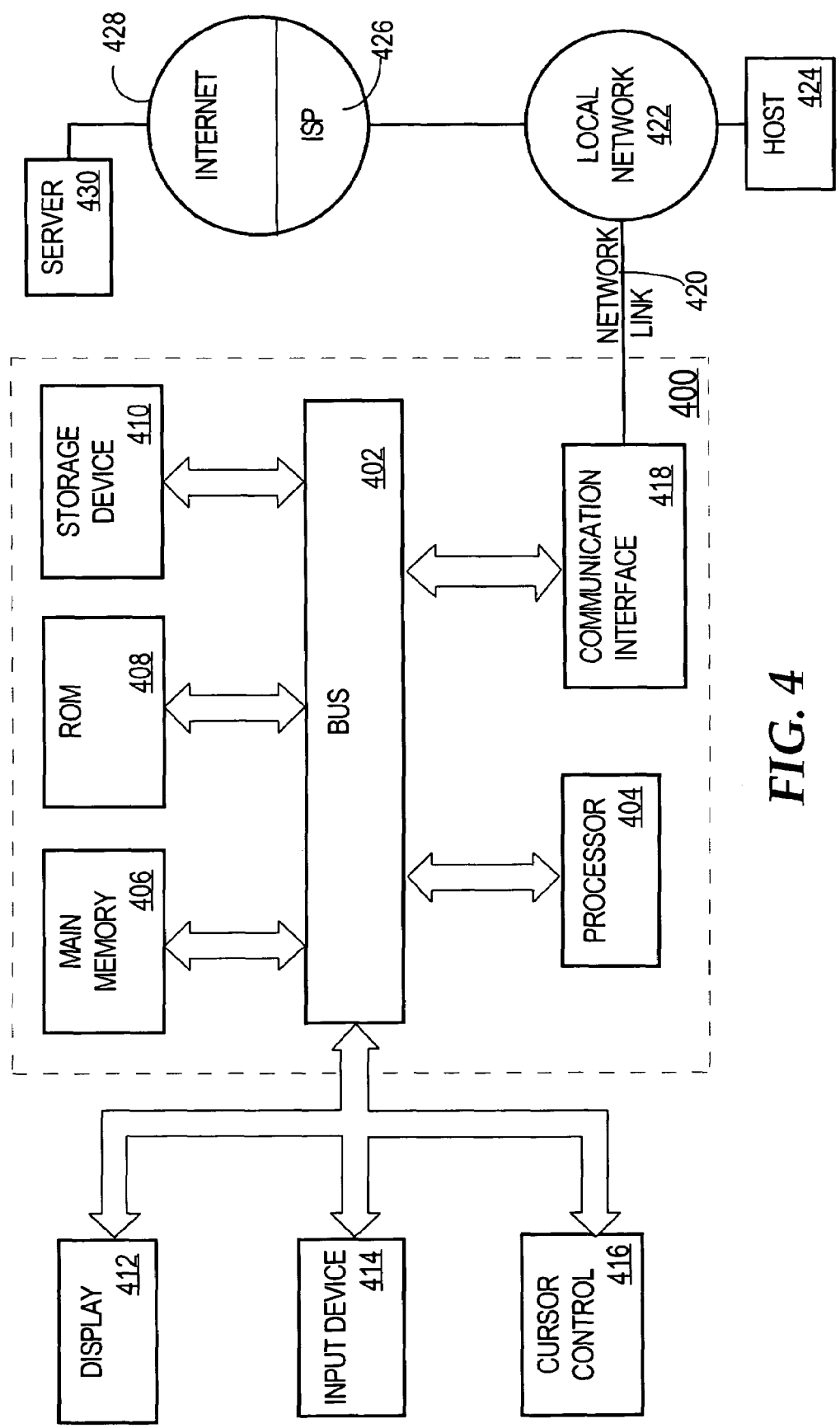
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, optical disk, or magneto-optical disk, is provided and coupled to bus 402 for storing information and instructions.

Computer system 400 may be coupled via bus 402 to a display 412, such as a cathode ray tube (CRT) or a liquid crystal display (LCD), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical, magnetic, or magneto-optical disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

What is claimed is:

1. A method for performing a remastering operation on resources in a cluster having a plurality of nodes, the method comprising the computer-implemented steps of:
   generating, for each node of said plurality of nodes in said cluster, a hash table for accessing information about resources that are mastered by said node;
   wherein each said hash table has a number of hash buckets which is a whole number multiple of a number of hash buckets in a smallest hash table among said hash tables for said plurality of nodes;
   hashing resources to each of said hash tables using a hash function that is based on a modulus of said number of hash buckets in said respective hash table;
   identifying a first set of resources, from a group of resources that is mastered by a first node and that is hashed to a first hash table that is used by said first node to access information about resources in said group of resources;
   wherein resources of said first set of resources are to be migrated to a second node during said remastering operation, and are to be hashed, using said hash function that is based on said modulus, to a second hash table that is used by said second node to access information about resources that are mastered by said second node;
   identifying, within said first set of resources, a first subset of resources that includes some but not all resources of said first set of resources;
   transferring, from said first node to said second node, information about one or more resource from said first subset of resources, while freezing no more resources than said first subset of resources from said first set of resources.

2. The method of claim 1, wherein the step of freezing comprises freezing only said one or more resources from said first subset of resources.

3. The method of claim 1 wherein said first set of resources includes resources associated with a plurality of hash buckets of said first hash table, and wherein the step of freezing includes freezing less than all of said plurality of hash buckets.

4. The method of claim 1, further comprising the computer-implemented steps of:
   unfreezing resources, from said first subset of resources, that were frozen; and
   identifying, within said first set of resources, a second subset of resources that includes some but not all resources of said first set of resources and that does not include any of said resources from said first subset of resources; and
   transferring, from said first node to another node, information about one or more resource from said second subset of resources, while freezing no more resources than said second subset of resources from said first set of resources.

5. The method of claim 1, wherein said first subset of resources is identified by a window that corresponds to
   a first bucket set of one or more hash buckets to which said first subset of resources hash in said first hash table; and
   a second bucket set of one or more hash buckets to which said first subset of resources hash in said second hash table.

6. The method of claim 5 wherein the number of hash buckets in said first bucket set is different than the number of hash buckets in said second bucket set.

7. The method of claim 5, wherein said hash buckets in said first bucket set map to said hash buckets in said second bucket set, and wherein said hash buckets in said first bucket set never map to said hash buckets in said second bucket set with a many-to-many relationship.

8. The method of claim 5, wherein if said first hash table and said second hash table have an equal number of hash buckets, then said window of buckets contains an equal number of hash buckets for said first hash table and for said second hash table.

9. The method of claim 1, wherein each of said hash tables has a number of hash buckets which is a power of two.

10. A computer-readable medium carrying one or more sequences of instructions which, when executed by one or more processors, causes the one or more processors to perform the method recited in claim 1, wherein said computer-readable medium is one of volatile memory or non-volatile memory.

11. A computer-readable medium carrying one or more sequences of instructions which, when executed by one or more processors, causes the one or more processors to perform the method recited in claim 2, wherein said computer-readable medium is one of volatile memory or non-volatile memory.

12. A computer-readable medium carrying one or more sequences of instructions which, when executed by one or more processors, causes the one or more processors to perform the method recited in claim 3, wherein said computer-readable medium is one of volatile memory or non-volatile memory.

13. A computer-readable medium carrying one or more sequences of instructions which, when executed by one or more processors, causes the one or more processors to perform the method recited in claim 4, wherein said computer-readable medium is one of volatile memory or non-volatile memory.

14. A computer-readable medium carrying one or more sequences of instructions which, when executed by one or more processors, causes the one or more processors to perform the method recited in claim 5, wherein said computer-readable medium is one of volatile memory or non-volatile memory.

15. A computer-readable medium carrying one or more sequences of instructions which, when executed by one or more processors, causes the one or more processors to perform the method recited in claim 6, wherein said computer-readable medium is one of volatile memory or non-volatile memory.

16. A computer-readable medium carrying one or more sequences of instructions which, when executed by one or more processors, causes the one or more processors to perform the method recited in claim 7, wherein said computer-readable medium is one of volatile memory or non-volatile memory.

17. A computer-readable medium carrying one or more sequences of instructions which, when executed by one or more processors, causes the one or more processors to perform the method recited in claim 8, wherein said computer-readable medium is one of volatile memory or non-volatile memory.

18. A computer-readable medium carrying one or more sequences of instructions which, when executed by one or more processors, causes the one or more processors to perform the method recited in claim 9, wherein said computer-readable medium is one of volatile memory or non-volatile memory.

19. A method for performing a remastering operation on resources in a cluster having a plurality of nodes, the method comprising the computer-implemented steps of:

generating, for each node of said plurality of nodes in said cluster, a hash table for accessing information about resources that are mastered by said node;

wherein each said hash table has a number of hash buckets which is a whole number multiple of a number of hash buckets in a smallest hash table among said hash tables for said plurality of nodes;

hashing resources to each of said hash tables using a hash function that is based on a modulus of said number of hash buckets in said respective hash table;

identifying a first set of resources, from a group of resources that are mastered by one or more first nodes and that are hashed to hash buckets in respective first hash tables that are used by said respective first nodes to access information about some resources in said group of resources;

wherein resources of said first set of resources are to be migrated to one or more second nodes during said remastering operation, and are to be hashed, using said hash function that is based on said modulus, to hash buckets in respective second hash tables that are used by said respective second nodes to access information about resources that are mastered by said respective second nodes;

identifying a window of one or more corresponding hash buckets in each respective first hash table, wherein said one or more corresponding hash buckets in each first hash table corresponds with said one or more corresponding hash buckets in each other first hash table, and wherein said corresponding hash buckets in said first hash tables are associated with a first subset of resources that includes some but not all resources of said first set of resources;

identifying one or more hash buckets, corresponding with said window, in each respective second hash table, wherein said one or more hash buckets in said second hash tables will be associated with said first subset of resources;

transferring, from said one or more first nodes to said one or more second nodes, information about one or more resource from said first subset of resources, while freezing no more resources than said first subset of resources from said first set of resources.

20. The method of claim 19, wherein at least one of said one or more first hash tables is the same table as one of said one or more second hash tables.

21. A computer-readable medium carrying one or more sequences of instructions which, when executed by one or more processors, causes the one or more processors to perform the method recited in claim 19, wherein said computer-readable medium is one of volatile memory or non-volatile memory.

22. A computer-readable medium carrying one or more sequences of instructions which, when executed by one or more processors, causes the one or more processors to perform the method recited in claim 20, wherein said computer-readable medium is one of volatile memory or non-volatile memory.

23. A method for organizing information about resources in a cluster having asymmetric nodes, the method comprising the computer-implemented steps of:

generating, for each node of a plurality of nodes in said cluster, a hash table for accessing information about resources that are mastered by said node;

wherein each said hash table has a size that is a whole number multiple of a smallest hash table among said hash tables for said plurality of nodes; and hashing resources to each of said hash tables using a hash function that is based on a modulus of said size of said respective hash table.

24. The method of claim 23, wherein each of said hash tables has a size that is a power of two.

25. The method of claim 23, wherein any subset of resources from said resources is identified by a window that corresponds to a first bucket set of one or more hash buckets to which said subset of resources hash in a first hash table for a first node; and a second bucket set of one or more hash buckets to which said subset of resources hash in a second hash table for a second node.

26. The method of claim 25, wherein said hash buckets in said first bucket set map to said hash buckets in said second bucket set, and wherein said hash buckets in said first bucket set never map to said hash buckets in said second bucket set with a many-to-many relationship.

27. A computer-readable medium carrying one or more sequences of instructions which, when executed by one or more processors, causes the one or more processors to perform the method recited in claim 23, wherein said computer-readable medium is one of volatile memory or non-volatile memory.

28. A computer-readable medium carrying one or more sequences of instructions which, when executed by one or more processors, causes the one or more processors to perform the method recited in claim 24, wherein said computer-readable medium is one of volatile memory or non-volatile memory.

29. A computer-readable medium carrying one or more sequences of instructions which, when executed by one or more processors, causes the one or more processors to perform the method recited in claim 25, wherein said computer-readable medium is one of volatile memory or non-volatile memory.

30. A computer-readable medium carrying one or more sequences of instructions which, when executed by one or more processors, causes the one or more processors to perform the method recited in claim 26, wherein said computer-readable medium is one of volatile memory or non-volatile memory.

31. A computer-readable medium storing:

a hash table for accessing information about resources that are mastered by a particular node of a plurality of nodes in a cluster;

wherein the hash table is one of a plurality of hash tables used by nodes in the cluster to access information about resources that are mastered by the nodes;

wherein each node of the plurality of nodes has a corresponding hash table of the plurality of hash tables;

wherein the plurality of hash tables includes at least one hash table with a smallest number of hash buckets;

wherein the hash table of at least one node of the plurality of nodes has a greater number of hash buckets than the smallest number of hash buckets;

wherein the hash table used by each node of the plurality of nodes has a number of hash buckets that is a whole number multiple of the smallest number of hash buckets;

wherein hash functions used to access each hash table of the plurality of hash tables use a modulus operation to generate hash values; and wherein said computer-readable medium is one of volatile memory or non-volatile memory.

\* \* \* \* \*